United States Patent [19]

Chida et al.

[11] 4,421,262

[45] Dec. 20, 1983

[54] PAPER TRACTOR

[75] Inventors: Yoshinori Chida; Satoru Tada, both of Tokyo, Japan

[73] Assignee: Seikosha Co., Ltd., Tokyo, Japan

[21] Appl. No.: 221,978

[22] Filed: Jan. 2, 1981

[30] Foreign Application Priority Data

Jan. 22, 1980 [JP] Japan .................................. 55-6201
Jan. 22, 1980 [JP] Japan .................................. 55-6202

[51] Int. Cl.[3] ........................ B65H 17/38; G03B 1/24

[52] U.S. Cl. ........................................ 226/79; 226/76; 226/83; 474/902

[58] Field of Search ....................... 226/79, 76, 74, 82, 226/83; 474/902, 903; 464/52, 53, 179, 182, 162; 403/298, 359, 383

[56] References Cited

U.S. PATENT DOCUMENTS

| | | | |
|---|---|---|---|
| 232,635 | 9/1880 | Fetter | 474/903 X |
| 2,377,896 | 6/1945 | Metzner | 226/79 X |
| 2,683,599 | 7/1954 | Davidson et al. | 226/79 |
| 2,764,896 | 10/1956 | Arthur | 474/902 X |
| 3,549,068 | 12/1970 | Calano | 226/79 |
| 3,747,820 | 7/1973 | Hawxhurst | 226/76 |
| 4,196,831 | 4/1980 | Druschitz et al. | 226/79 |
| 4,197,969 | 4/1980 | Sasaki | 226/79 |
| 4,227,821 | 10/1980 | Plaza et al. | 226/79 |
| 4,235,360 | 11/1980 | Levinson | 226/76 |

FOREIGN PATENT DOCUMENTS

| | | | |
|---|---|---|---|
| 328947 | 5/1930 | United Kingdom | 474/903 |

*Primary Examiner*—Stanley N. Gilreath
*Attorney, Agent, or Firm*—Robert E. Burns; Emmanuel J. Lobato; Bruce L. Adams

[57] ABSTRACT

A paper tractor for feeding paper of different widths in printers and the like comprises a rotationally driven shaft having mounted thereon a sprocket wheel which engages in perforations in a length of paper to effect lengthwise feeding of the paper in response to rotation of the sprocket wheel. The sprocket wheel is mounted on the drive shaft to undergo rotational movement therewith and is mounted on the drive shaft to undergo axial sliding movement therealong to enable axial positioning of the sprocket wheel to accommodate paper of different widths. The drive shaft has a polygonal cross-section, and the sprocket wheel has a center tubular sleeve formed of plastic and configured to be slideably inserted over the drive shaft so that rotational movement of the drive shaft is transmitted to the sprocket wheel. The tubular sleeve is provided with a set of axially extending grooves which render the sleeve radially resilient so that the sleeve frictionally engages with the drive shaft with a frictional force-fit which is effective to maintain the sprocket wheel in a preselected axial position during rotational movement thereof yet which permits the sprocket wheel to be manually slid along the drive shaft so as to easily adjust the axial position of the sprocket wheel to thereby enable the feeding of paper of different widths.

3 Claims, 15 Drawing Figures

PAPER TRACTOR

BACKGROUND OF THE INVENTION

The present invention relates to a paper tractor for use in serial printers or the like devices.

Generally, in the known paper tractors, a sprocket wheel acting as a driving wheel is rotationally driven by a drive shaft having a polygonal cross-section or by a spline shaft. The sprocket wheel is movable in the axial direction so that its position may be adjusted to meet various paper widths.

In the conventional paper tractors, the arrangement is such that the position of the sprocket wheel is determined by using a stationary shaft (guide shaft) in addition to the drive shaft as a reference of position, due to restrictions in the structure and assembling and from the view point of easiness of the position adjusting operation. Namely, conventional paper tractors have a member which is slidable in the axial direction of the stationary shaft. This member is adjustably fixed to the stationary shaft such that the position of the sprocket wheel in relation to the drive shaft in the axial direction of the latter is determined through the medium of this member.

The use of the stationary shaft as a reference, however, inevitably generates a clearance error between the abovementioned member and the sprocket wheel, resulting in a deterioration of the positional precision of the sprocket wheel to cause a breadthwise offset of the recording paper and degradation of the quality of printing.

The paper tractors of this kind employ impractically large number of parts and require a number of steps in the assembling process, resulting in an extremely high cost. For the inspection and maintenance of the printing head, it is necessary to demount the paper tractor. The demounting and mounting of the paper tractor require troublesome work.

Under these circumstances, the present invention aims at providing a paper tractor of a simplified construction, which is easy to assemble and which permits an easy setting of the position of the sprocket wheel, thereby overcoming the above-described problems of the prior art.

BRIEF DESCRIPTION OF THE DRAWINGS

The accompanying drawings show a paper tractor constructed in accordance with an embodiment of the invention in which.

Hereinafter, a preferred embodiment of the invention will be described with reference to the accompanying drawings.

Figure 1:
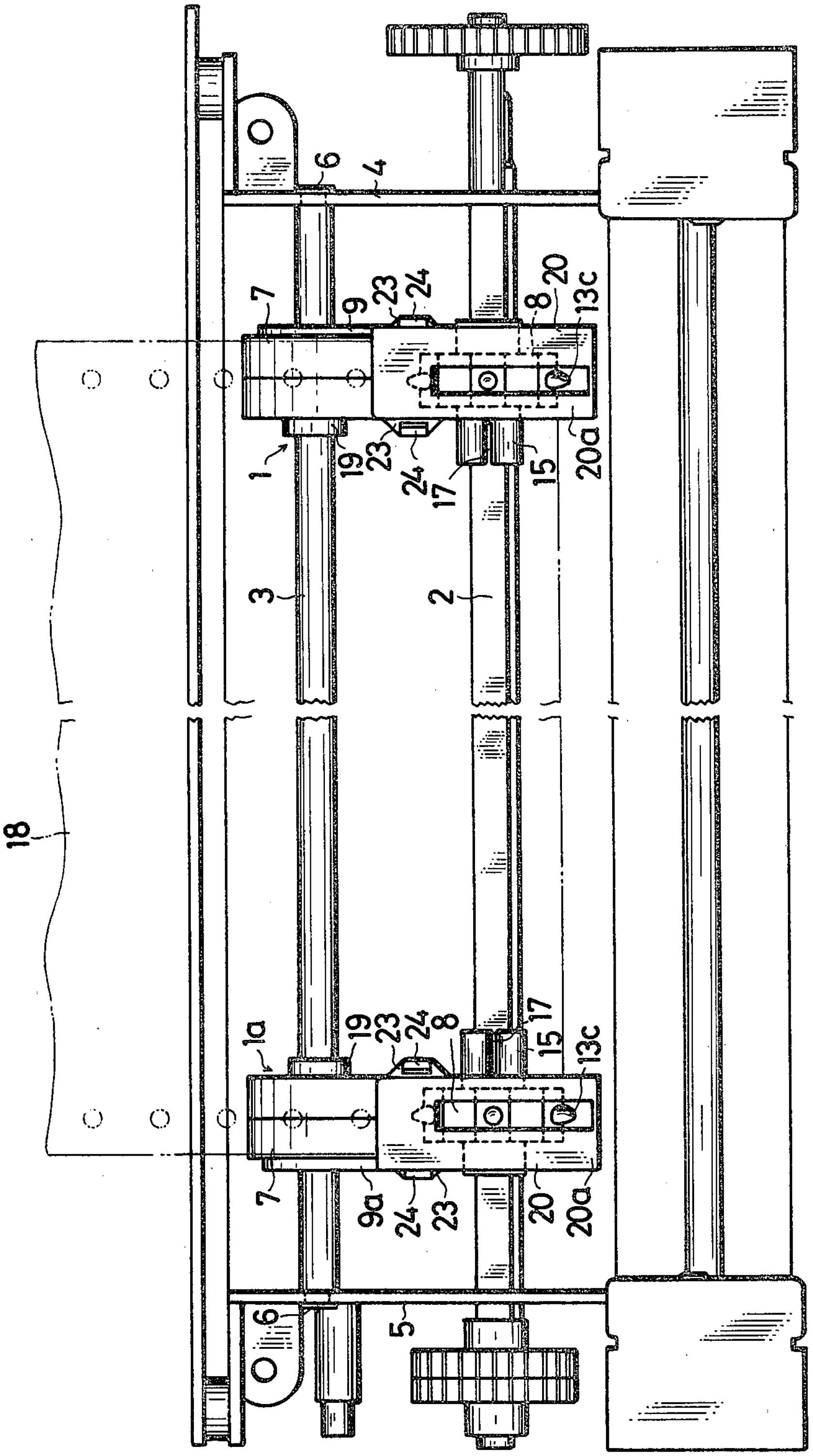
FIG. 1 is a schematic plan view showing the whole part of the paper tractor.
Figure 2:
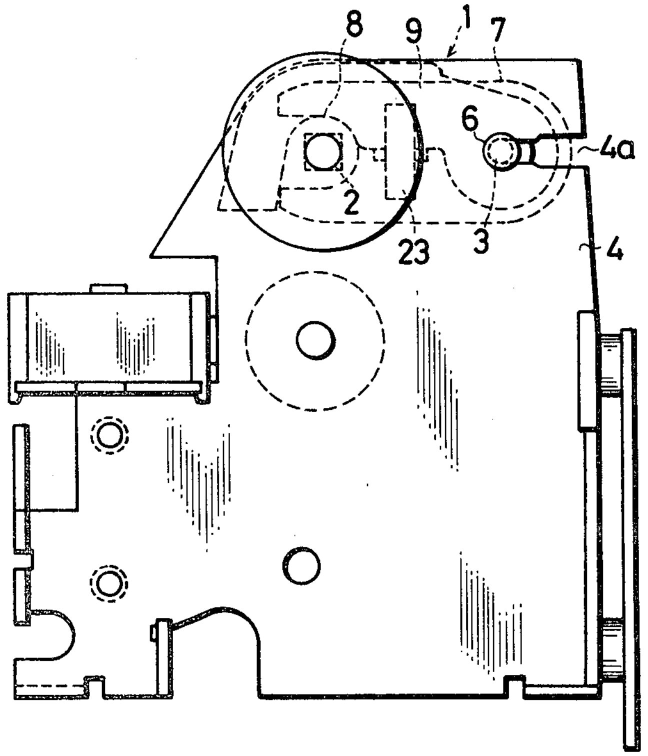
FIG. 2 is a right side elevational view.

Referring to FIGS. 1 and 2, a pair of paper tractors 1 and 1*a* are mounted on a drive shaft 2 which has a a polygonal cross-section and on a stationary shaft 3 which has a circular cross-section. The drive shaft 2 is rotatably supported by a pair of side plates 4,5, while the stationary shaft 3 is received by elongated holes formed in the side plates 4,5 and is fixed by means of screws 6,6. Although only the elongated hole 4*a* in the side plate 4 is shown in FIG. 2, a similar elongated hole is formed in the side plate 5. A frame 7 and a sprocket wheel 8 are incorporated in each of the paper tractors 1,1*a*. Namely, the frame 7 and the sprocket wheel 8 of the paper tractor 1 have the same shapes and constructions as those in the paper tractor 1*a*. In addition, the paper retaining cover 9 and the paper retaining cover 9*a*, which are incorporated in the paper tractors 1 and 1*a*, respectively, are constructed in symmetry with respect to each other.

Hereinafter, a detailed explanation will be made as to the construction of each of the constituents, i.e. frame 7, sprocket wheel 8 and the paper retaining cover 9 (9*a*), as well as the relationship between these constituents and the drive shaft 2 and stationary shaft 3.

Figure 9:
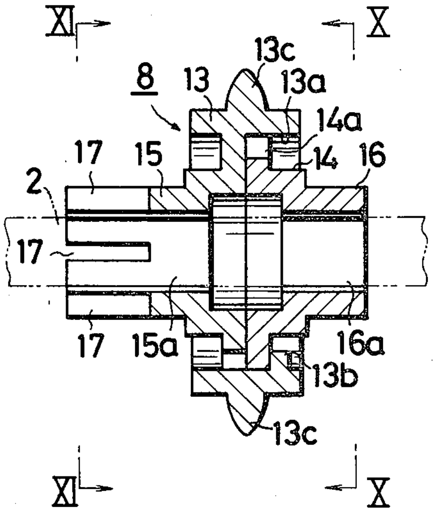
FIG. 9 is a sectional view of a sprocket wheel.
Figure 10:
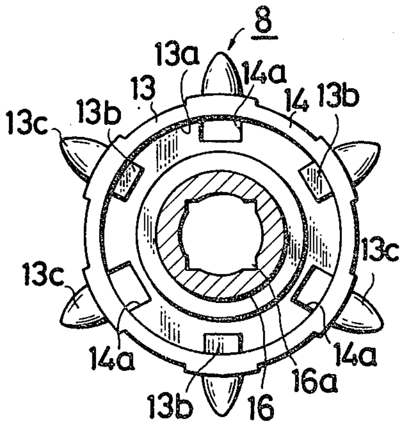
FIG. 10 is a sectional view taken along the line X—X of FIG. 9.
Figure 11:
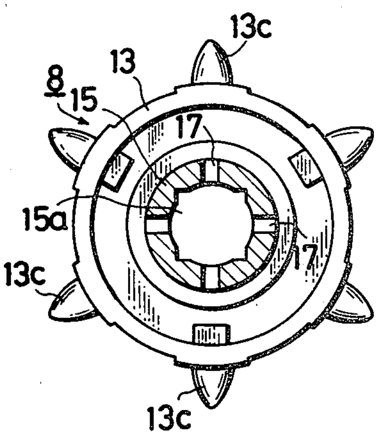
FIG. 11 is a sectional view taken along the line XI—XI of FIG. 9.
Figure 12:
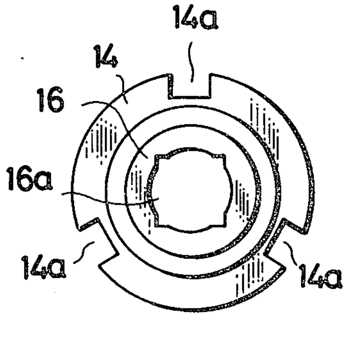
FIG. 12 is a front elevational view of a second rotary part of the sprocket wheel.

Referring to FIGS. 3 to 8, the frame 7 has a symmetrical construction so that it may be used commonly for both of the right and left paper tractors 1,1*a* (See FIG. 1). In the illustrated embodiment, the frame 7 is constituted by two parts which are formed separately and then united with each other. It is, however, possible to form these parts as a unit from the beginning. As will be seen from FIGS. 7 and 8, the frame 7 is provided with a shaft bore 10 at its rear portion, and a space 11 is defined at the rear side of the bore 10. Side plates defining this space 11 have U-shaped bearing bores 12,12. The space 11 is ample enough to accommodate the central portion of the sprocket wheel 8. As will be understood from FIGS. 9 to 12, the sprocket wheel 8 is constituted by a first rotary part 13 and a second rotary part 14 which are made of a plastic. A so-called bayonet type coupling is constituted by three retainer projections 13*b* formed on the inner peripheral surface of a recess 13*a* at one side (right side as viewed in FIG. 9) of the first rotary part 13, and three retainer grooves 14*a* formed radially inwardly in the peripheral edge of the side plate of the second rotary part 14 (See FIG. 12). By fitting both rotary parts 13,14 to each other with the retainer projections 13*b* and the retainer grooves 14*a* engaging each other, and by rotating these two rotary parts 60° relatively to each other, these two rotary parts 13,14 are pressed to each other to form one rigid member as shown in FIGS. 9 to 11.

The rotary parts 13,14 are provided with tubular sleeves 15,16 extending axially outwardly from the outer sides thereof. Each sleeve 15,16 has a shaft bore 15*a*,16*a* formed at the center thereof and shaped to slidably receive the drive shaft 2 having a polygonal cross-section. The shaft bores 15*a*,16*a* are axially aligned with each other in the assembled state shown in FIGS. 9 to 11. The sleeve 15 is provided with four axial grooves or slits 17. These axially extending grooves 17 provide the sleeve 15 with a radial resiliency with which the sleeve 15 engages frictionally and resiliently with the drive shaft 2 in the state shown in FIG. 3. This arrangement permits the sprocket wheel 8 to be frictionally held by the drive shaft 2 in such a manner as not to be able to rotate relative to the drive shaft so that the sprocket wheel 8 is rotated together with the drive shaft 2 as the latter rotates.

In addition, when a force exceeding the frictional force between the sprocket wheel 8 and the drive shaft 2 is applied to the sprocket wheel 8, the wheel is moved axially. Thus, the axial position of the sprocket wheel 8 can be adjusted and set as desired to meet the width of the recording paper 18. By such a construction, the sprocket wheel 8 is held to the drive shaft 2 by a frictional force-fit which is effective to cause the sprocket wheel to always rotate together with the drive shaft and to enable the sprocket wheel to be manually slid along the drive shaft to adjust the axial position of the wheel along the shaft.

The sprocket wheel 8 is provided with a set of sprockets 13*c* formed around the periphery of the first rotary part 13. The sprockets 13*c* engage the perforations (not shown) of the recording paper 18, so that the recording paper 18 is fed in the direction of arrow along the guide surface 7*a* of the frame 7 as the sprocket wheel 8 rotates, as viewed in FIG. 3. Although the sprocket wheel 8 is constituted by two separate rotary parts 13,14, it is, however, possible to form the sprocket wheel 8 as an integral body by injection molding.

Figure 4:
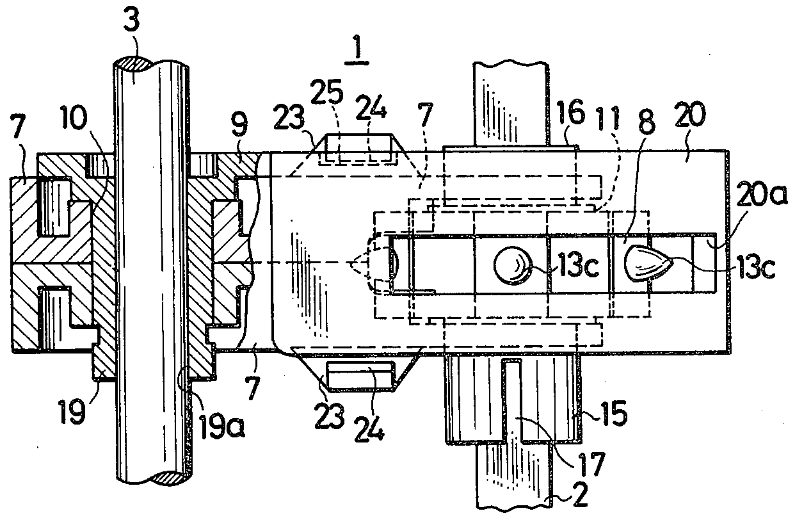
FIG. 4 is a partly cut-away plan view of a part shown in FIG. 3.
Figure 7:
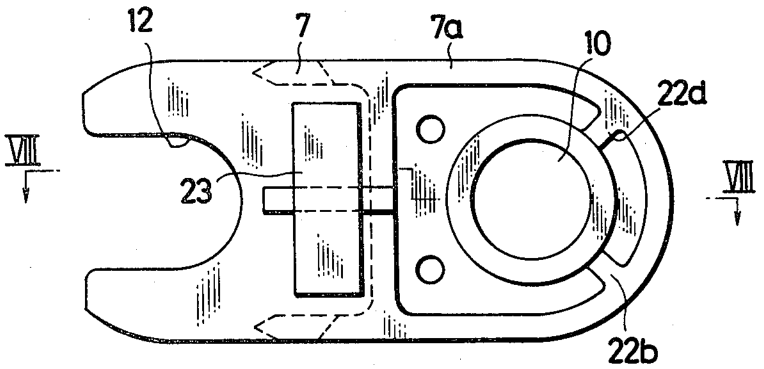
FIG. 7 is a front elevational view of the frame.
Figure 8:
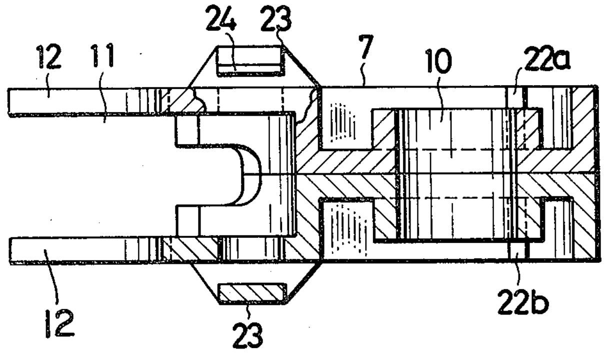
FIG. 8 is a sectional view taken along the line VIII—VIII of FIG. 7.
Figure 13:
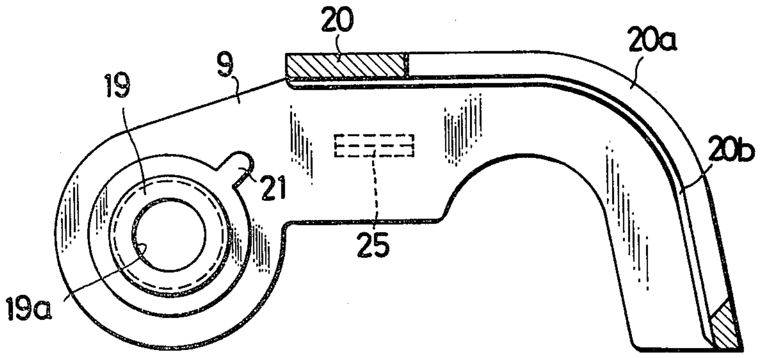
FIG. 13 is a partly cut-away front elevational view of a paper retaining cover.
Figure 14:
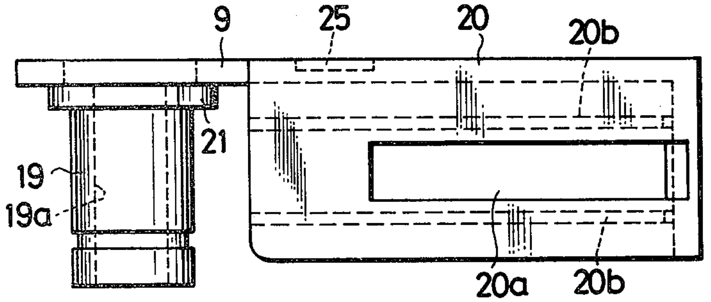
FIG. 14 is a plan view of a paper retaining cover.
Figure 15:
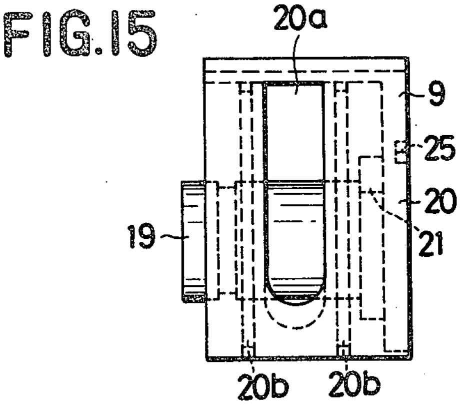
FIG. 15 is a right side elevational view of the paper retaining cover.

As will be seen from FIGS. 13 to 15, the paper retainer cover 9 has a substantially -shaped configuration, and is provided at the inner side of the rear end thereof with a bearing portion 19 which, as shown in FIG. 4, is rotatably received by the shaft bores 10 of the frame 7. The bearing portion 19 has a central bore 19*a* which receives the stationary shaft 3 with a certain looseness or margin.

Figure 5:
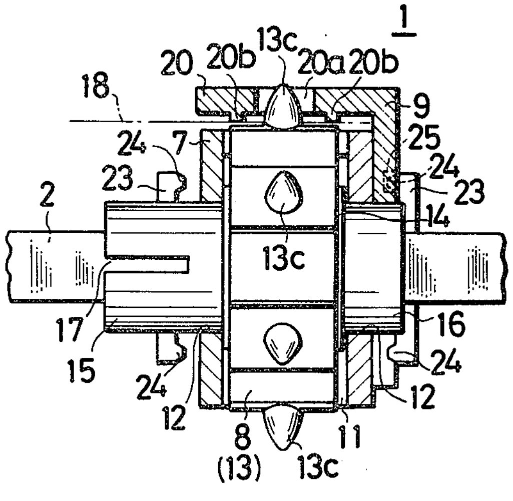
FIG. 5 is a partly cut-away side elevational view of the part shown in FIG. 3.

The paper retainer cover 9 is provided at its upper portion with a retainer plate 20 formed unitarily therewith. The retainer plate 20 is so positioned as to cover the upper side of the sprocket wheel 8. The retainer plate 20 is provided with an elongated slot 20*a* along the locus of rotation of the sprockets 13*c* so as not to obstruct the rotation of the sprockets 13*c*. Also, two guide ridges 20*b*, 20*b* are formed on the reverse side of the retainer plate 20 so as to extend in parallel with the elongated slot 20*a*. The arrangement is such that the guide ridges 20*b*,20*b* effectively prevents the recording paper from floating, as shown in FIG. 5.

Figure 3:
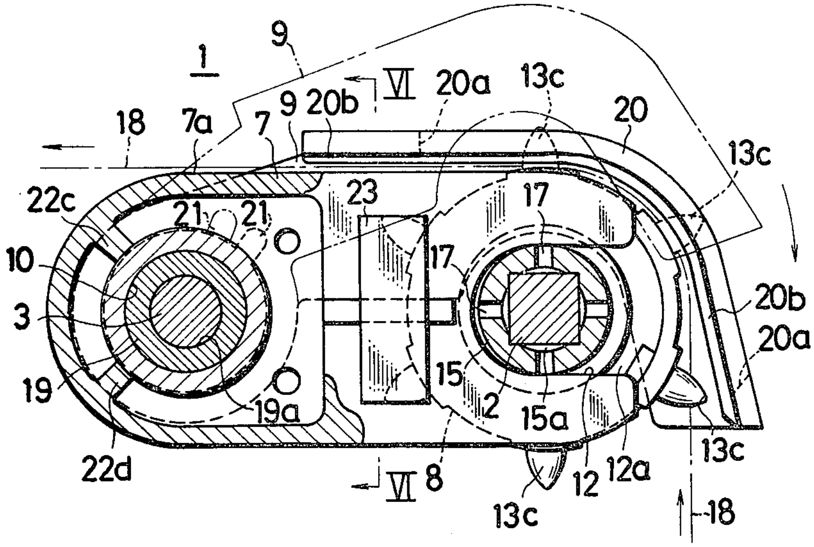
FIG. 3 is a partly cut-away front elevational view of an essential part.

As will be seen from FIG. 13, the paper retainer cover 9 is provided at the inner side of the rear end thereof with a degree determination projection 21 adapted to abut the stopper 22*a* out of the stoppers 22*a*,22*b*,22*c* and 22*d* (See FIGS. 7 and 8) thereby to prevent the paper retainer cover 9 from rotating in the opening direction, i.e. in the counter-clockwise direction as viewed in FIG. 3. Also, a clicking groove 25 is formed in the outer side surface of the paper retainer cover 9.

Figure 6:
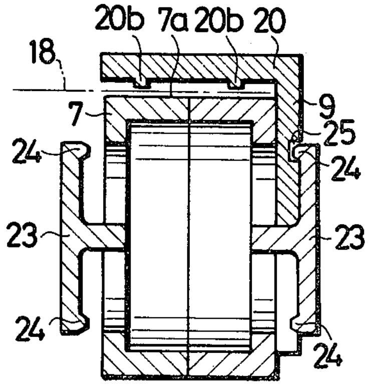
FIG. 6 is a sectional view taken along the line VI—VI of FIG. 3.

In order that the frame 7 may be used commonly for each of the right and left paper tractors 1*a*,1, and that the paper retaining cover 9 of the paper tractor 1 and the paper retaining cover 9*a* of the paper tractor 1*a* may be retained by a common frame 7 (paper retainer cover 9*a* has a construction symmetrical with the paper retaining cover 9, the same reference numerals being used in FIG. 1 to denote the same parts as those of the retainer cover 9), click springs 23,23 of T-shaped cross-section are formed on both sides of the frame 7 as shown in FIG. 6. Click claws 24 engageable with the click groove 25 are formed to project from the inner sides of both ends of each click spring 23.

Hereinafter, an explanation will be made as to how the paper tractors 1,1*a* are assembled.

Referring to FIG. 1, two sprocket wheels 8,8 are attached to the drive shaft 2 which is carried by the side plates 4,5. Then, the bearing portions 19,19 of the paper retaining covers 9 and 9*a* are inserted into the bearing bores 10,10 (See FIG. 8) of the frames 7,7. Then, the stationary shaft 3 (See FIG. 4) is inserted into the central bores 19*a*,19*a* of the bearing portions 19,19, and two frames 7,7 each being equipped with a paper retainer cover are set on the stationary shaft 3.

Thereafter, the bearing bores 12,12 of the frames 7,7 equipped with the paper retaining covers and receiving the stationary shaft 3 are made to oppose to the sprocket wheels 8,8 mounted on the drive shaft 2, and the stationary shaft 3 is moved along the elongated slots (See FIG. 2) of the side plates 4,5. In this state, the spaces 11,11 of the frames 7,7 (See FIG. 8) receive the sprocket wheels 8,8 and the sleeves 15,15,16,16 of the two sprocket wheels 8,8 are rotatably received by the U-shaped bearing bores 12,12. Finally, the stationary shaft 3 is fixed to the side plates 4,5 by means of screws 6,6 thereby to complete the assembling.

In the paer tractor of the invention having the described construction, the sprocket wheel for feeding the recording paper directly and closely fits the drive shaft, so that the position of the sprocket wheel can be adjusted directly and manually to meet various widths of recording paper. In the conventional paper tractor, the fixation of the sprocket wheel is made by means of a screw or the like. If the sprocket wheel happens to be stopped at such an angular position as to direct the screw inwardly, it is necessary to turn the sprocket wheel manually to direct the screw outwardly to make the latter accessible. The driving of the screw is extremely difficult because the space around the driving wheel of the sprocket wheel is so limited due to the presence of the printing head, the ink ribbon and so forth. For this reason, in the conventional paper tractor, the position of the sprocket wheel has to be made with reference to a stationary shaft different from the drive shaft.

In the paper tractor of the invention, although the sprocket wheel is manually adjustable in the axial direction, no clearance error rattle is allowed in the axial direction during the operation of the paper tractor, so that the widthwise offset of the recording paper is completely avoided to ensure a high quality of the printing. In addition, the tractor of the invention has a reduced number of parts, so that the assembling, replacement of parts and so forth are very much facilitated, as well as the maintenance and inspection.

What is claimed:

1. In a paper tractor for use in feeding recording paper of different widths in printers or the like, the combination comprising: a rotary drive shaft having a polygonal cross-section; a sprocket wheel having a set of sprockets for engaging in perforations in the recording paper in response to rotation of the sprocket wheel and having two tubular sleeves extending outwardly from opposite lateral portions of said sprocket wheel and having a center bore shaped to non-rotationally receive therein said drive shaft and through which slidably extends said drive shaft, at least one of said sleeves having a set of spaced slots extending axially along the sleeve to cause the sleeve to resiliently and frictionally engage said drive shaft with a frictional force-fit effective to maintain the sprocket wheel in a predetermined axial position on the drive shaft during use of the paper tractor and effective to enable manual sliding movement of the sprocket wheel on the drive shaft against the resistance offered by the frictional force-fit to adjust the axial position of the sprocket wheel to accommodate recording paper of different widths; a stationary shaft disposed in spaced apart and parallel relationship with respect to said rotary drive shaft; a paper cover having a tubular portion turnably and slidably received on said stationary shaft thereby mounting said paper cover for turning movement on said stationary shaft between opening and closing positions relative to said sprocket wheel, said paper cover including a retainer plate effective to cover the upper part of said sprocket wheel; and a frame on which is turnably disposed said tubular portion and having a pair of side arms configured to embrace said sprocket wheel from opposite sides of the latter, said side arms having substantially U-shaped bearing bores rotatably receiving respective ones of said sleeves of the sprocket wheel.

2. A paper tractor as claimed in claim 1; in which said frame has means for retaining said paper cover at the closing position.

3. A paper tractor as claimed in claim 1 or 2; in which said frame is configured symmetrically with respect to a line interconnecting the center points of said rotary drive shaft and said stationary shaft.

* * * * *